(No Model.)
A. T. WENTWORTH.
SECURING DEVICE.
No. 425,719. Patented Apr. 15, 1890.
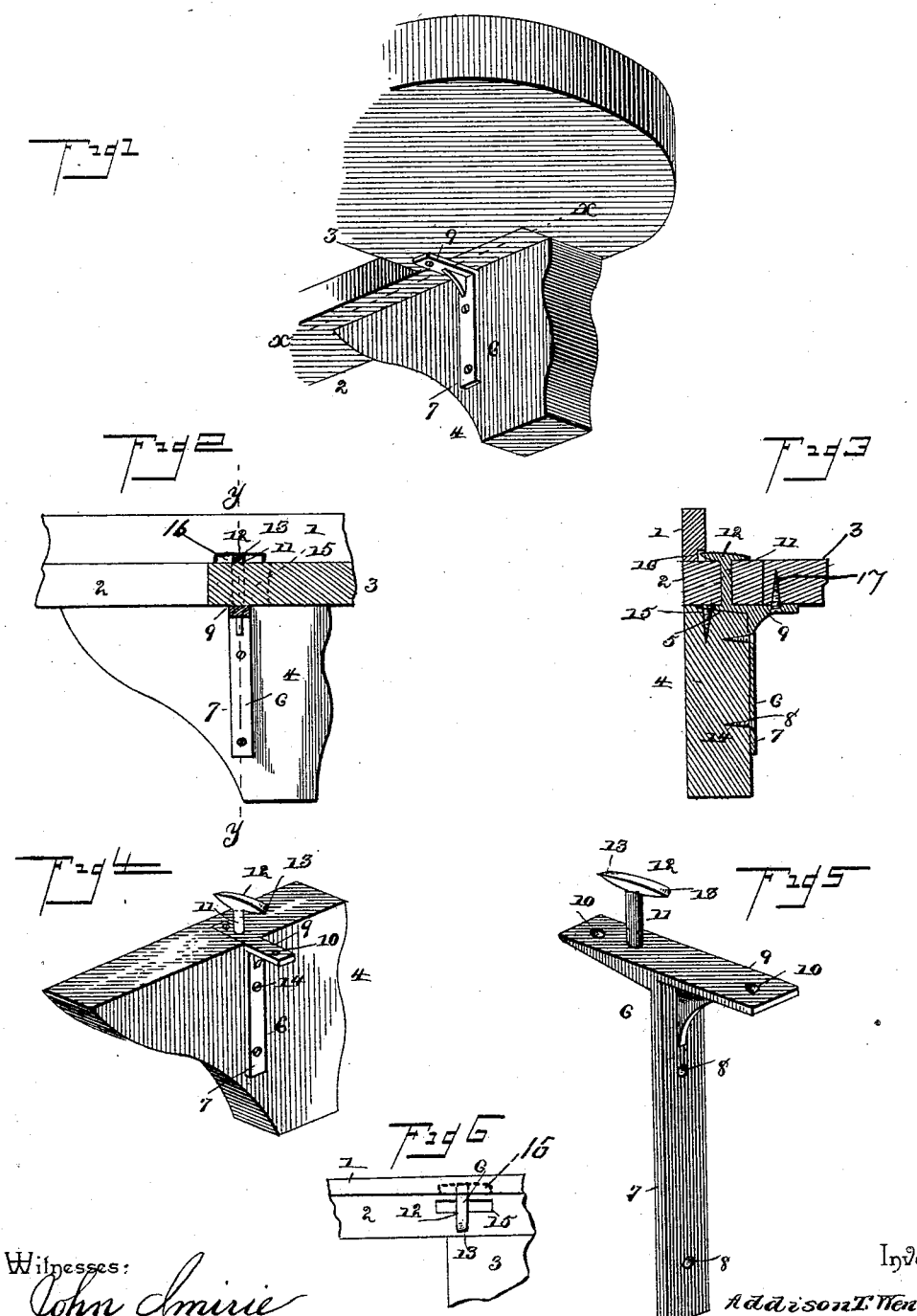
Witnesses:
John Imirie
[signature]
Inventor
Addison T. Wentworth
By his Attorneys,
C. A. Snow & Co.

UNITED STATES PATENT OFFICE.

ADDISON T. WENTWORTH, OF CONWAY, IOWA.

SECURING DEVICE.

SPECIFICATION forming part of Letters Patent No. 425,719, dated April 15, 1890.

Application filed July 11, 1889. Serial No. 317,107. (No model.)

*To all whom it may concern:*

Be it known that I, ADDISON T. WENTWORTH, a citizen of the United States, residing at Conway, in the county of Taylor and State of Iowa, have invented a new and useful Securing Device, of which the following is a specification.

This invention has relation to a securing device for securing the legs of sofas to the frame thereof, and though herein described as for this purpose it will be apparent that the same may be employed for securing the legs to other pieces of furniture.

Among the objects in view are to provide a casting constructed and adapted to be secured firmly to the upper end of a leg and for removable connection with the frame of a sofa or other piece of furniture, whereby not only a firm and rigid connection of said legs with the sofa is effected, but the legs are adapted for ready detachment from the sofa-frame or other article of furniture, whereby the same may be readily transported without risk of snapping off the leg.

A further object of the invention is to obviate all doweling, gluing, nailing, &c., and provide the above-described device in a simple manner and at a minimum cost.

With these general objects in view the invention consists in the provision of a rectangular T-shaped casting, the shank of which is provided with screw-holes adapted for connection with the inner face of a leg, and the T portion of which is also perforated for the reception of screws, one portion of the T being designed to fit in and be secured to a recess in the upper end of the leg, and the opposite portion of the T to a cross-bar or other convenient portion of the furniture-frame.

The invention also consists in a T-lug, cast or connected with that portion of the T overlapping the end of the leg and adapted to be inserted through a longitudinal opening formed in the side rail of the frame and to be turned a quarter-way and provided with opposite undercut shoulders, whereby said leg is drawn snugly to position and rigidly connected with the frame.

Referring to the drawings, Figure 1 is a bottom perspective of a portion of a sofa-frame, the leg of which is secured thereto in accordance with my invention. Fig. 2 is a longitudinal section on line *x x* of Fig. 1; Fig. 3, a transverse section through the joint of the leg and frame on line *y y* of Fig. 2; Fig. 4, a perspective of the device applied to a leg detached from the sofa. Fig. 5 is a perspective of the device detached from the leg. Fig. 6 is a detail plan view showing the slot through which the T-shaped lug is inserted.

Like numerals of reference indicate like parts in all the figures of the drawings.

1 represents the side rail of a sofa, 2 the usual bottom rail parallel with the side rail, and 3 the usual cross-bar connecting the bottom rails.

4 represents a sofa-leg of the usual construction, and upon its upper end is provided with an inclined recess 5.

6 represents the connecting device, and the same is a T-shaped malleable casting, and consists of a shank 7, having a series of screw-openings 8 and at its upper end a T-head 9, each arm of which is provided with a screw-opening 10, that portion of the T to the rear of the shank being tapered or beveled. Projecting upwardly from the rear portion of the T and in line therewith is a T-lug 11, having a cylindrical stem or shank the head 12 of which is provided at opposite sides of its shank with oppositely-disposed beveled drawing-shoulders 13. The casting described is mounted upon the leg 4, the beveled portion of the T resting in the recess 5, and held therein and to the leg by means of screws 14, inserted through the perforations 10 and 8, by which means the connection is rigid with the leg.

In applying the leg to a sofa, elongated openings 15 are formed at those points in the bottom rails 2 to which the legs are to be connected, said openings being of a size sufficient to permit of the passage therethrough of a T-lug 11, the depth of the opening being not quite so deep as the shank of the T-lug, so that in reality the under surface or diagonally-opposite portions of the head of the lug are not entirely clear or above the upper edge of the opening, but the undercut shoulders 13 of the head are. In inserting the lug for the purpose of connecting the leg with the sofa the leg is disposed in a transverse direction with relation to the sofa, and after the lug has been passed through the opening said leg is given a quarter-turn, so as to bring it in line with the sofa. In giving the leg the quarter-turn the opposite shoulders bind upon the upper surface and at each side of the opening, and serve to draw the leg snugly up against the under surface of the rail 2. A recess 16 is formed in the rail 1 adjacent to the opening 15 in the rail 2, which recess permits of the quarter-turn of the lug and receives one end of the same when the leg is in position. After the leg has been placed in position a screw 17 is inserted through the opening 10 in the outer end of the T-shaped casting, and thus an additional securing medium is provided, the leg being thus prevented from turning and a consequent withdrawal.

Having described my invention, what I claim is—

1. A device for securing legs to furniture, consisting of a T-shaped casting having screw holes or openings, one of the arms of said T-shaped casting being beveled on its under side and provided on its upper side with a T-shaped lug having a cylindrical stem or shank, substantially as set forth.

2. The herein-described T-shaped casting, having screw holes or openings, one of the arms of said casting being beveled on its under side and provided on its upper side with a T-shaped lug having undercut ends or shoulders and a cylindrical stem or shank, as an article of manufacture, substantially as set forth.

3. The combination, with the rail 2 and cross-bar 3 of a sofa, the former provided with a longitudinal slot 15, of the leg 4, having the upper recess 5, and the casting 6, consisting of the shank 7, having perforations 8 and secured to the leg by screws passing through the opening, and having the T-head 9 at its upper end, the front portion of which is provided with a screw-opening 10, through which passes a screw into the cross-bar 3, and the rear portion of which is beveled and mounted in a recess 5 and provided with a perforation 10, through which is passed a screw into the leg, and is further provided with a T-lug 11, the head 12 of which is in line with the head 9 and has its opposite shoulders undercut or beveled and bearing at both sides of the opening 15, substantially as specified.

In testimony that I claim the foregoing as my own I have hereto affixed my signature in presence of two witnesses.

ADDISON T. WENTWORTH.

Witnesses:
N. P. NELSON,
A. F. CONNETT.